United States Patent

Choi et al.

(10) Patent No.: US 9,906,277 B2
(45) Date of Patent: Feb. 27, 2018

(54) PROTOCOL FOR COOPERATION COMMUNICATION BETWEEN ACCESS POINTS IN OVERLAPPED BASIC SERVICE SET (OBSS) ENVIRONMENT

(71) Applicant: Electronics and Telecommunications Research Institute, Daejeon (KR)

(72) Inventors: Jee Yon Choi, Daejeon (KR); Jae Woo Park, Daejeon (KR); Yu Ro Lee, Daejeon (KR); Jae Seung Lee, Daejeon (KR); Il Gyu Kim, Chungcheongbuk-do (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/462,370

(22) Filed: Mar. 17, 2017

(65) Prior Publication Data

US 2017/0195010 A1    Jul. 6, 2017

Related U.S. Application Data

(63) Continuation of application No. 14/681,425, filed on Apr. 8, 2015, now Pat. No. 9,602,174.

(30) Foreign Application Priority Data

Apr. 8, 2014  (KR) .................. 10-2014-0041808
Apr. 8, 2014  (KR) .................. 10-2014-0041809

(Continued)

(51) Int. Cl.
*H04B 7/024* (2017.01)
*H04B 7/0408* (2017.01)
*H04B 7/0456* (2017.01)

(52) U.S. Cl.
CPC .......... *H04B 7/024* (2013.01); *H04B 7/0408* (2013.01); *H04B 7/0456* (2013.01)

(58) Field of Classification Search
CPC ........ B06B 1/0292; G01N 29/24; H04B 7/02; H04B 7/024; H04B 15/00; H04Q 7/00;
(Continued)

(56) References Cited

U.S. PATENT DOCUMENTS

2007/0206628 A1   9/2007   Nishio et al.
2008/0192686 A1*  8/2008   Cho .................. H04W 16/14
                                                370/329

(Continued)

FOREIGN PATENT DOCUMENTS

JP   2013-106079 A   5/2013
KR   10-2014-0040829 A   4/2014

*Primary Examiner* — Andrew Lai
*Assistant Examiner* — Leon Andrews
(74) *Attorney, Agent, or Firm* — NSIP Law

(57) ABSTRACT

Disclosed is a protocol for transmitting data through cooperation between access points in an overlapped basic service set (OBSS) environment. A cooperative beamforming communication method may include negotiating, by a first access point, a cooperative transmit beamforming with a second access point having an OBSS area with the first access point; transmitting, by the first access point, a clear-to-send (CTS) to the second access point; and performing, by the first access point, the cooperative transmit beamforming with the second access point during a cooperative transmit beamforming duration determined through the negotiation after a predetermined time interval is elapsed, when transmission of the CTS is completed.

15 Claims, 12 Drawing Sheets

(30) Foreign Application Priority Data

Apr. 6, 2015 (KR) .......................... 10-2015-0048169
Apr. 6, 2015 (KR) .......................... 10-2015-0048170

(58) Field of Classification Search
CPC ... H04W 16/14; H04W 72/046; H04W 74/08; H04W 84/12
See application file for complete search history.

(56) References Cited

U.S. PATENT DOCUMENTS

| | | | |
|---|---|---|---|
| 2009/0301200 A1* | 12/2009 | Tanaka | B06B 1/0292 73/603 |
| 2012/0257574 A1* | 10/2012 | Seok | H04W 72/046 370/328 |
| 2014/0119303 A1 | 5/2014 | Kwon et al. | |
| 2014/0177546 A1 | 6/2014 | Kang et al. | |

* cited by examiner

FIG. 6

| FC | Duration | RA | TA | CoTx control | CoTx AP info1 | CoTx AP info2 | ... | CoTx AP infon | FCS |

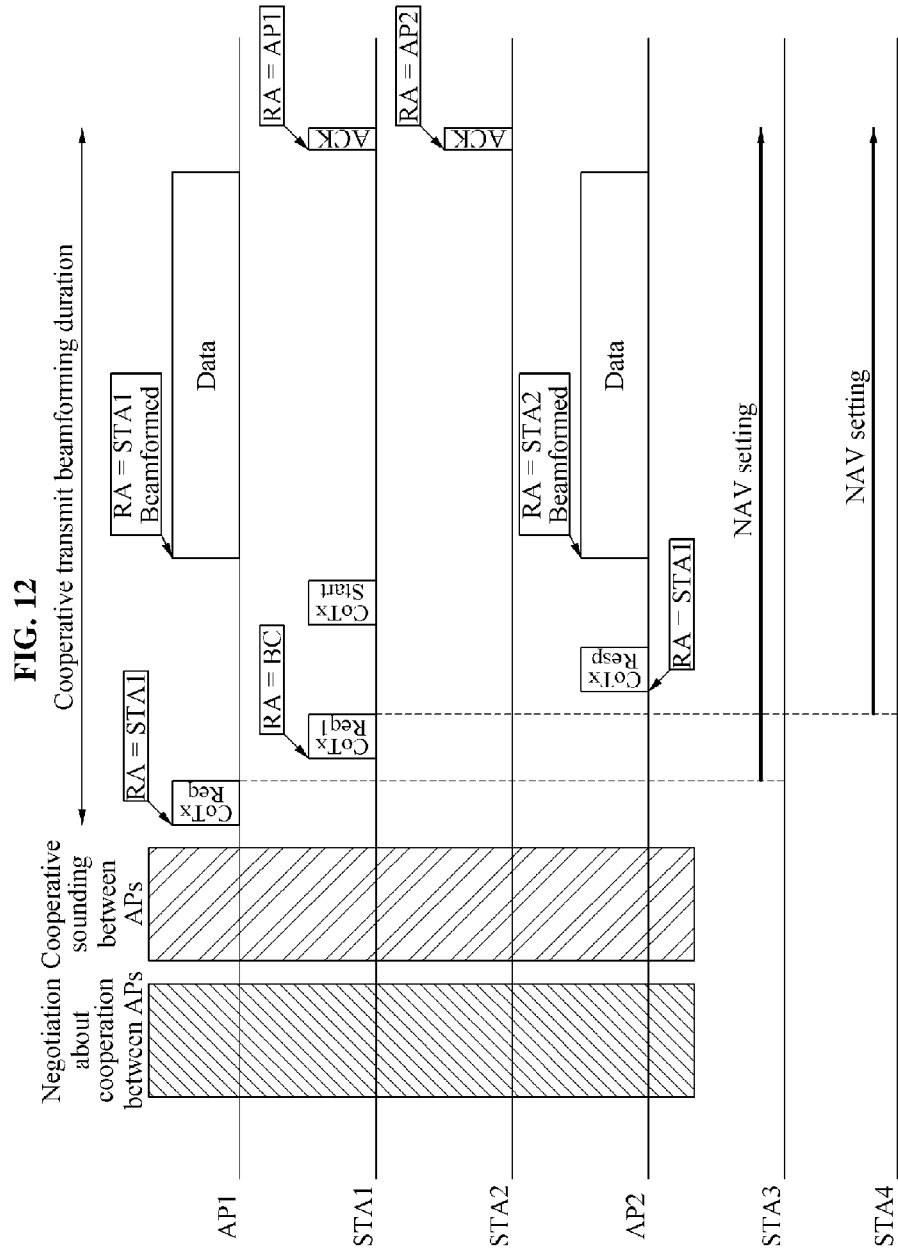

PROTOCOL FOR COOPERATION COMMUNICATION BETWEEN ACCESS POINTS IN OVERLAPPED BASIC SERVICE SET (OBSS) ENVIRONMENT

CROSS-REFERENCE TO RELATED APPLICATIONS

This application is a continuation of U.S. application Ser. No. 14/681,425, filed Apr. 8, 2015, now U.S. Pat. No. 9,602,174 B2, which claims the priority benefit of Korean Patent Application No. 10-2014-0041808, filed on Apr. 8, 2014, Korean Patent Application No. 10-2014-0041809, filed on Apr. 8, 2014, Korean Patent Application No. 10-2015-0048169, filed on Apr. 6, 2015, and Korean Patent Application No. 10-2015-0048170, filed on Apr. 6, 2015, in the Korean Intellectual Property Office, the disclosures of which are incorporated herein by reference.

BACKGROUND

1. Field of the Invention

Embodiments of the present invention relate to a media access control (MAC) protocol of a wireless local area network (WLAN), and more particularly, to a protocol for transmitting data through cooperation between access points (APs) in an overlapped basic service set (OBSS) environment.

2. Description of the Related Art Currently, multiple input multiple output (MIMO) communication technology for transmitting and receiving data using two or more antennas has been generalized in a wireless communication system. Further, according to standards starting from an Institute of Electrical and Electronics Engineers (IEEE) 802.11n standard, a wireless local area network (WLAN) allows two or more transmit antennas to be available. According to the IEEE 802.11n standard, up to four transmit antennas may be used. According to an IEEE 802.11ac standard, up to eight transmit antennas may be used. In addition, when using a plurality of transmit antennas, data may be transmitted using a transmit beamforming technology to improve the signal reception performance. The IEEE 802.11ac standard includes a downlink multi-user (MU) MIMO technology that enables an access point (AP) to concurrently transmit beamformed data frames to a plurality of stations (STAs).

However, according to a recent increase in the complexity of a WLAN environment, an overlapped basic service set (OBSS) frequently appears. Here, the OBSS indicates an overlapping area between a BSS corresponding to a service area covered by a single AP and a BSS covered by another AP. In an OBSS environment, the transmission efficiency may be degraded and thus, a method for performing an efficient transmission even in the OBSS environment is required.

SUMMARY

According to an aspect, there is provided a cooperative beamforming communication method including negotiating, by a first access point, a cooperative transmit beamforming with a second access point having an overlapped basic service set (OBSS) area with the first access point; transmitting, by the first access point, a clear-to-send (CTS) to the second access point; and performing, by the first access point, the cooperative transmit beamforming with the second access point during a cooperative transmit beamforming duration determined through the negotiation after a predetermined time interval is elapsed, when transmission of the CTS is completed.

The cooperative beamforming communication method may further include performing, by the first access point, cooperative sounding with the second access point. The performing of the cooperative sounding may include acquiring, by the first access point, a precoding matrix to be used for the cooperative transmit beamforming.

A duration field of the CTS may be set as a time when the cooperative transmit beamforming duration is terminated.

The predetermined time interval may be a short interframe space (SIFS).

The performing of the cooperative transmit beamforming may include transmitting, by the first access point, a first beamformed data frame to a first station positioned in the OBSS area; and transmitting, by the second access point, a second beamformed data frame to a second station positioned in the OBSS area.

According to another aspect, there is provided a cooperative beamforming communication method including negotiating, by a first access point, a cooperative transmit beamforming with a second access point having an BSS area with the first access point; resetting, by the first access point, a network allocation vector (NAV) of the first access point in response to a CTS associated with the negotiation received from the second access point; and performing, by the first access point, the cooperative transmit beamforming with the second access point during a cooperative transmit beamforming duration determined through the negotiation after a predetermined time interval is elapsed, when reception of the CTS is completed.

The cooperative beamforming communication method may further include performing, by the first access point, cooperative sounding with the second access point. The performing of the cooperative sounding may include acquiring, by the first access point, a precoding matrix to be used for the cooperative transmit beamforming.

A duration field of the CTS may be set as a time when the cooperative transmit beamforming duration is terminated.

The predetermined time interval may be a SIFS.

The performing of the cooperative transmit beamforming may include transmitting, by the first access point, a first beamformed data frame to a first station positioned in the OBSS area; and transmitting, by the second access point, a second beamformed data frame to a second station positioned in the OBSS area.

According to still another aspect, there is provided a cooperative beamforming communication method including negotiating a cooperative transmit beamforming between a plurality of access points having an OBSS area; transmitting, by at least one of the access points, a CTS to one or more other access points among the access points; resetting, by the one or more other access points, a NAV of the one or more other access points in response to the CTS; and performing, by the plurality of access points, the cooperative transmit beamforming during a cooperative transmit beamforming duration determined through the negotiation.

The cooperative beamforming communication method may further include performing cooperative sounding between the plurality of access points. The performing of the cooperative sounding may include acquiring, by each of the plurality of access points, a precoding matrix to be used for the cooperative transmit beamforming. A duration field of the CTS may be set as a time when the cooperative transmit beamforming duration is terminated.

The performing of the cooperative transmit beamforming may include transmitting, by the one or more access points, a first beamformed data frame after a predetermined time interval is elapsed, when transmission of the CTS is completed; and transmitting, by the one or more other access points, a second beamformed data frame after a predetermined time interval is elapsed, when reception of the CTS is completed. The predetermined time interval may be a SIFS.

According to still another aspect, there is provided an access point to perform cooperative beamforming communication, the access point including a communicator configured to transmit and receive a frame associated with negotiation about a cooperative transmit beamforming with one or more other access points having an OBSS area with the access point, to transmit a CTS to the one or more other access points, and to perform the cooperative transmit beamforming with the one or more other access points; and a controller configured to control the communicator to generate a frame associated with the negotiation and to transmit the generated frame to the one or more other access points, to control the communicator to process the frame associated with the negotiation and transmit a CTS to the one or more other access points in response to the frame associated with the negotiation received from the other access point to the communicator, and to control the communicator to perform the cooperative transmit beamforming with the one or more other access points during a cooperative transmit beamforming duration determined through the negotiation after a predetermined time interval is elapsed, when transmission of the CTS is completed.

The controller may also control the communicator to perform cooperative sounding with the one or more other access points. The performing of the cooperative sounding may include acquiring, by the access point, a precoding matrix to be used for the cooperative transmit beamforming.

A duration field of the CTS may be set as a time when the cooperative transmit beamforming duration is terminated.

The predetermined time interval may be a SIFS.

According to still another aspect, there is provided an access point to perform cooperative beamforming communication, the access point including a communicator configured to transmit and receive a frame associated with negotiation about a cooperative transmit beamforming with one or more other access points having an OBSS area with the access point, to receive a CTS from the one or more other access points, and to perform the cooperative transmit beamforming with the one or more other access points; and a controller configured to control the communicator to generate a frame associated with the negotiation and to transmit the generated frame to the one or more other access points, and to control the communicator to process the frame associated with the negotiation in response to the frame associated with the negotiation received the one or more other access points to the communicator, to reset a NAV in response to the CTS received by the communicator from the other access point, to reset a NAV in response to the CTS received by the communicator from the one or more other access points, and to perform the cooperative transmit beamforming with the one or more other access points during a cooperative transmit beamforming duration determined through the negotiation after a predetermined time interval is elapsed, when reception of the CTS is completed.

The controller may also control the communicator to perform cooperative sounding with the one or more other access points. The performing of the cooperative sounding may include acquiring, by the access point, a precoding matrix to be used for the cooperative transmit beamforming.

A duration field of the CTS may be set as a time when the cooperative transmit beamforming duration is terminated.

The predetermined time interval may be a SIFS.

According to still another aspect, there is provided a cooperative beamforming communication method including negotiating, by a first access point, a cooperative transmit beamforming with a second access point having an OBSS area with the first access point; transmitting, by the first access point, a cooperative transmission request frame to the second access point; receiving, by the first access point, a cooperative transmission response frame that is transmitted from the second access point to the first access point in response to the cooperative transmission request frame; and performing, by the first access point, the cooperative transmit beamforming with the second access point during a cooperative transmit beamforming duration determined through the negotiation after a predetermined time interval is elapsed, when reception of the cooperative transmission response frame is completed.

The cooperative beamforming communication method may further include performing, by the first access point, cooperative sounding with the second access point. The performing of the cooperative sounding may include acquiring, by each of the first access point and the second access point, a precoding matrix to be used for the cooperative transmit beamforming.

A duration field of the cooperative transmission request frame and a duration field of the cooperative transmission response frame may be set as a time when the cooperative transmit beamforming duration is terminated.

The predetermined time interval may be a SIFS.

According to still another aspect, there is provided a cooperative beamforming communication method including negotiating, by a first access point, a cooperative transmit beamforming with one or more access points having an OBSS area with the first access point; broadcasting, by the first access point, a cooperative transmission request frame; receiving, by the first access point, a cooperative transmission response frame that is transmitted from the one or more access points to the first access point in response to the cooperative transmission request frame; and performing, by the first access point, the cooperative transmit beamforming with the one or more access points during a cooperative transmit beamforming duration determined through the negotiation after a predetermined time interval is elapsed, when reception of the cooperative transmission response frame is completed.

The one or more access points may include a second access point and a third access point. The receiving of the cooperative transmission response frame may include receiving a first cooperative transmission response frame transmitted from the second access point to the first access point; and receiving a second cooperative transmission response frame transmitted from the third access point to the first access point after the second access point transmits the first cooperative transmission response frame to the first access point. Here, the cooperative beamforming communication method may further include transmitting, by the first access point, a cooperative transmission start frame. The performing of the cooperative transmit beamforming may include transmitting, by each of the first access point, the second access point, and the third access point, a beamformed data frame when transmission of the cooperative transmission start frame is completed.

The one or more access points may include a second access point and a third access point. The receiving of the cooperative transmission response frame may include receiving a first cooperative transmission response frame transmitted from the second access point to the first access point; transmitting, by the first access point, a cooperative transmission response poll frame to the third access point in response to the first cooperative transmission response frame transmitted from the second access point to the first access point; and receiving a second cooperative transmission response frame transmitted from the third access point to the first access point in response to the cooperative transmission response poll frame. Here, the performing of the cooperative transmit beamforming includes transmitting, by each of the first access point, the second access point, and the third access point, a beamformed data frame when reception of the second cooperative transmission response frame is completed.

The cooperative beamforming cooperation method may further include performing cooperative sounding between the first access point and the one or more access points. The performing of the cooperative sounding may include acquiring, by each of the first access point and the one or more access points, a precoding matrix to be used for the cooperative transmit beamforming.

A duration field of the cooperative transmission request frame and a duration field of the cooperative transmission response frame may be set as a time when the cooperative transmit beamforming duration is terminated.

According to still another aspect, there is provided an access point to perform cooperative beamforming communication, the access point including a communicator configured to transmit and receive a frame associated with negotiation about a cooperative transmit beamforming with one or more other access points having an OBSS area with the access point, to transmit a cooperative transmission request frame to the one or more other access points, and to receive a cooperative transmission response frame that is transmitted from the one or more other access points in response to the cooperative transmission request frame; and a controller configured to control the communicator to generate a frame associated with the negotiation and to transmit the generated frame to the one or more other access points, and to control the communicator to process the frame associated with the negotiation in response to the frame associated with the negotiation received by the communicator from the one or more other access points, to generate the cooperative transmission request frame to be transmitted to the one or more other access points, and to perform the cooperative transmit beamforming with the one or more other access points during a cooperative transmit beamforming duration determined through the negotiation after a predetermined time interval is elapsed, when reception of the cooperative transmission response frame is completed.

The controller may also control the communicator to perform cooperative sounding with the one or more other access points. The performing of the cooperative sounding may include acquiring, by the access point, a precoding matrix to be used for the cooperative transmit beamforming.

A duration field of the cooperative transmission request frame and a duration field of the cooperative transmission response frame may be set as a time when the cooperative transmit beamforming duration is terminated.

The predetermined time interval may be a SIFS.

According to still another aspect, there is provided an access point to perform cooperative beamforming communication, the access point including a communicator configured to transmit and receive a frame associated with negotiation about a cooperative transmit beamforming with one or more other access points having an OBSS area with the access point, to broadcast a cooperative transmission request frame, and to receive a cooperative transmission response frame that is transmitted from the one or more access points to the first access point in response to the cooperative transmission request frame; and a controller configured to control the communicator to generate a frame associated with the negotiation and to transmit the generated frame to the one or more other access points, and to control the communicator to process the frame associated with the negotiation in response to the frame associated with the negotiation received by the communicator from the one or more other access points, to generate the cooperative transmission request frame, and to perform the cooperative transmit beamforming with the one or more access points during a cooperative transmit beamforming duration determined through the negotiation, when reception of the cooperative transmission response frame is completed.

The one or more access points may include a second access point and a third access point. The communicator may also receive a first cooperative transmission response frame transmitted from the second access point, and may receive a second cooperative transmission response frame transmitted from the third access point after the second access point transmits the first cooperative transmission response frame.

The communicator may also transmit a cooperative transmission start frame. Also, the controller may control the communicator to transmit a beamformed data frame when transmission of the cooperative transmission start frame is completed.

The one or more access points may include a second access point and a third access point. The communicator may receive a first cooperative transmission response frame transmitted from the second access point, may transmit a cooperative transmission response poll frame to the third access point in response to the first cooperative transmission response frame, and may receive a second cooperative transmission response frame transmitted from the third access point in response to the cooperative transmission response poll frame. Also, the controller may control the communicator to transmit a beamformed data frame when reception of the second cooperative transmission response frame is completed.

The controller may control the communicator to perform cooperative sounding with the one or more access points. The performing of the cooperative sounding may include acquiring, by the access point, a precoding matrix to be used for the cooperative transmit beamforming.

A duration field of the cooperative transmission request frame and a duration field of the cooperative transmission response frame may be set as a time when the cooperative transmit beamforming duration is terminated.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 6 illustrates a format of a cooperative transmission (CoTx) request frame according to an embodiment;

FIG. 12 illustrates still another example of a protocol for performing cooperative transmit beamforming between APs according to an embodiment.

DETAILED DESCRIPTION

Figure 1:
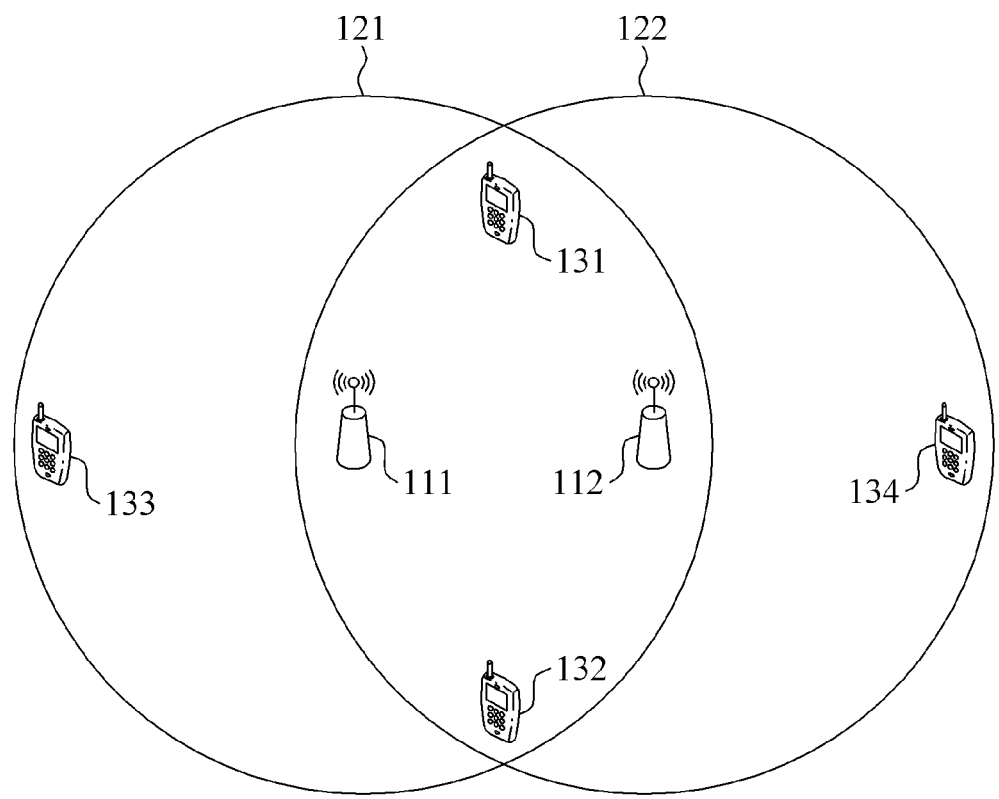
FIG. 1 illustrates an environment in which basic service sets (BSSs) covered by access points (APs) of a wireless local area network (WLAN) overlap.

Reference will now be made in detail to exemplary embodiments of the present invention, examples of which are illustrated in the accompanying drawings, wherein like reference numerals refer to like elements throughout. Exemplary embodiments are described below to explain the present invention by referring to the figures.

The terms used herein may be most widely used general terms that are selected based on functions in the proposed disclosure. However, the terms may be modified based on the intent or custom of those skilled in the art or the appearance of new art.

Also, in some cases, some terms may be arbitrarily used by the applicant to help the understanding and/or for convenience of description. In this example, the detailed meaning thereof will be described in a corresponding description portion. Accordingly, the terms used in the following description should be understood based on meanings of the terms and the overall description of the specification.

FIG. 1 illustrates an environment in which basic service sets (BSSs) covered by access points (APs) of a wireless local area network (WLAN) overlap.

Referring to FIG. 1, a BSS 121 is covered by an AP 111 and a BSS 122 is covered by an AP 112. Stations (STAs) 131 and 133 may belong to the BSS 121, and STAs 132 and 134 may belong to the BSS 122. An overlapping area may be present between the BSSs 121 and 122 of the APs 111 and 112. The STA 131 belonging to the BSS 121 and the STA 132 belonging to the BSS 122 may be positioned in the overlapping area. Here, when the BSSs 121 and 122 use the same frequency channel, the APs 111 and 112 and the STAs 131 and 132 may hear all of the transmitting frames. Accordingly, the transmission efficiency may be degraded in the overlapping area. A situation in which the degradation in the transmission efficiency occurs will be further described with reference to FIG. 2.

An AP according to an embodiment may include a controller and a communicator. The controller may generate a frame to be transmitted from the communicator, and the controller may also process a frame received by the communicator. The controller may control the communicator to communicate with a communicator with an STA using a multiple input multiple output (MIMO) communication method, and may determine an STA to perform communication through the communicator. The controller may be embodied using an integrated circuit (IC) chip, a microprocessor, and a mini computer. The communicator of the AP may communicate with a communicator with another AP or the communicator of the STA. The communicator may include a variety of communication modules such as an antenna, a modulator/demodulator, a frequency processing apparatus, and a filtering apparatus.

Figure 2:
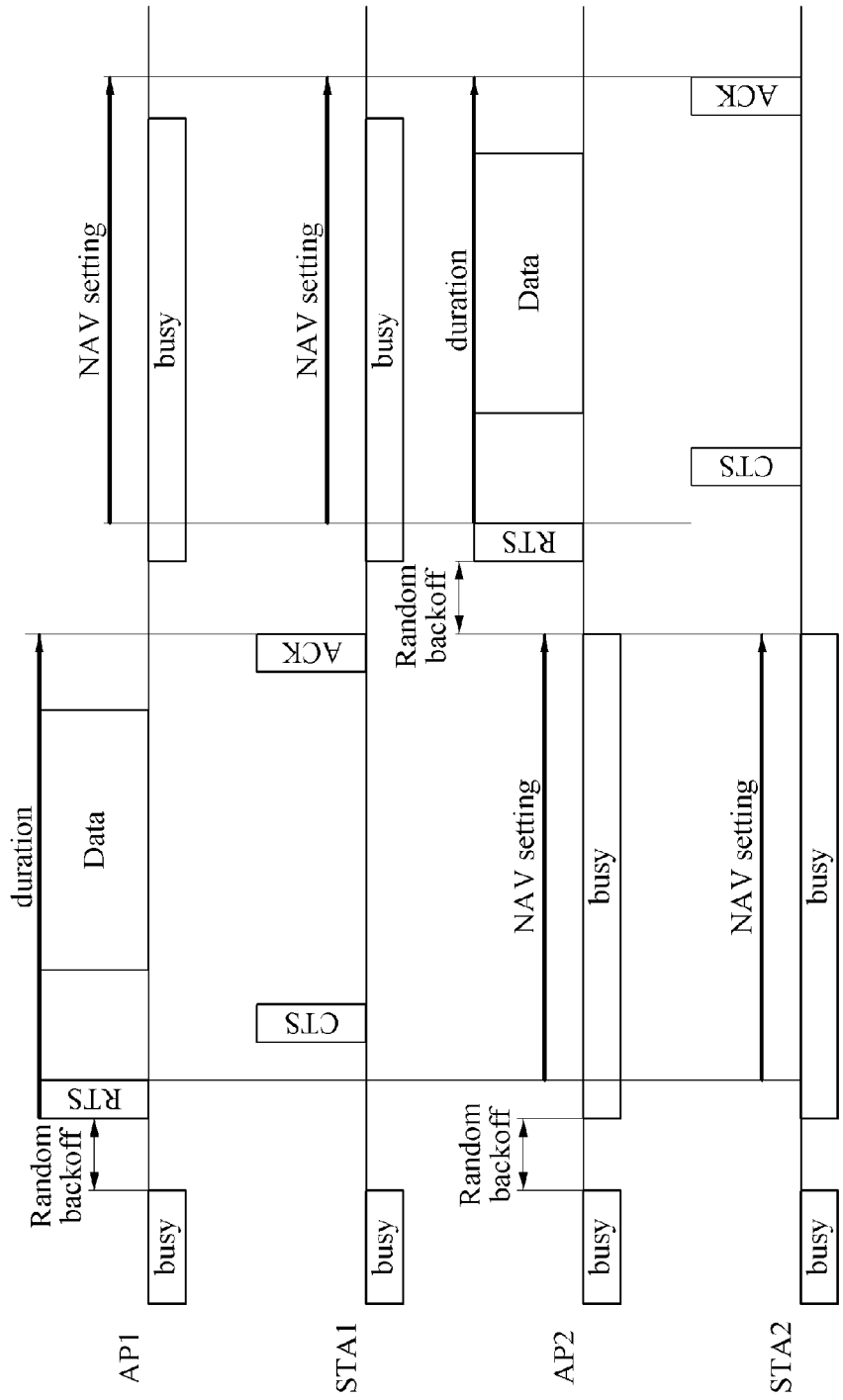
FIG. 2 illustrates a situation in which the transmission efficiency degrades in an environment in which BSSs covered by APs of a WLAN overlap according to the related art.

FIG. 2 illustrates a situation in which the transmission efficiency degraded in an environment in which BSSs covered by APs of a WLAN overlap according to the related art.

Referring to FIG. 2, in an example in which an overlapped BSS (OBSS) area is present between AP1 and AP2, and STA1 and STA2 are present in the OBSS area, when AP1 transmits a frame, channels of AP2 and STA2 are in a busy state. Similarly, when STA1 transmits a frame, the channels of AP2 and STA2 are in a busy state. Also, when AP2 transmits a frame, channels of AP1 and STA1 are in a busy state. Similarly, when STA2 transmits a frame, the channels of AP1 and STA1 are in a busy state. That is, compared to an environment in which an OBSS is absent, a busy state in which a transmission is impossible increases, which may lead to degrading the transmission efficiency. In particular, when a duration field of a frame transmitted from a neighboring BSS is not zero, a network allocation vector (NAV) is set as a value of the duration field and thus, the busy state in which the transmission is impossible may continue until the NAV is terminated, thereby degrading the transmission efficiency. Accordingly, there is a need for a method of preventing the transmission efficiency from being degraded in an OBSS environment. Proposed herein is a method that enables two or more APs to concurrently transmit data even in the OBSS environment, thereby enhancing the transmission efficiency in the OBSS environment.

Figure 3:
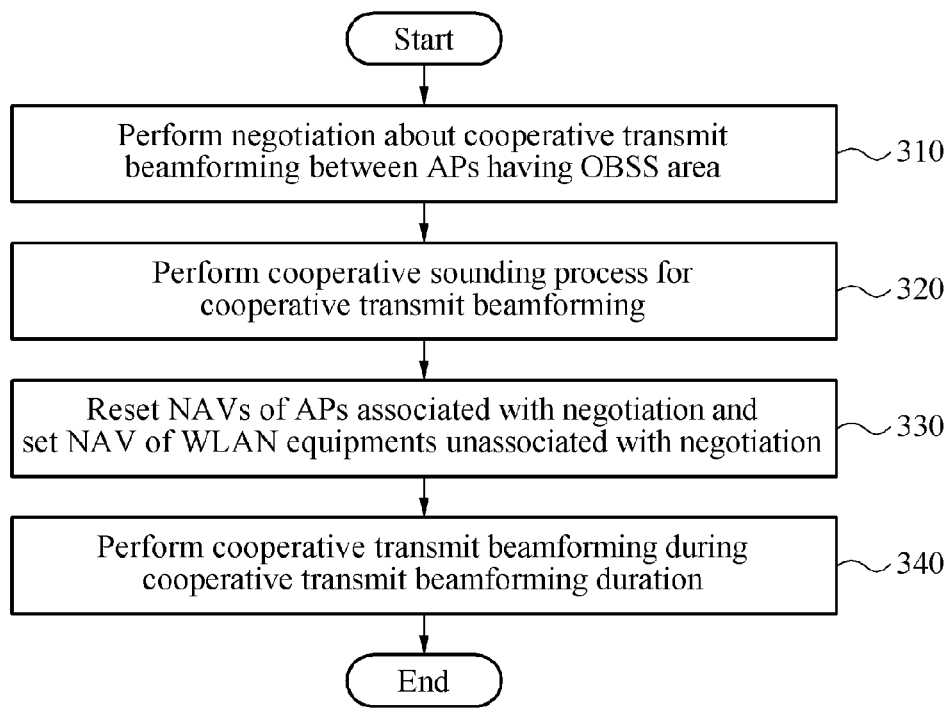
FIG. 3 is a flowchart illustrating a method of performing cooperative transmit beamforming between APs according to an embodiment.

FIG. 3 is a flowchart illustrating a method of performing cooperative transmit beamforming between APs according to an embodiment.

In operation 310, a negotiation about a cooperative transmit beamforming may be performed between neighboring APs having an OBSS area. Through the negotiation, APs to participate in the cooperative transmit beamforming and a cooperative transmit beamforming duration may be determined. According to an embodiment, a leading AP to lead the cooperative transmit beamforming may be determined among the APs determined to participate in the cooperative transmit beamforming, through the negotiation. Operation 310 may be performed through wired or wireless communication between the APs.

In operation 320, a cooperative sounding process for the cooperative transmit beamforming between the APs associated with the negotiation, that is, the APs to participate in the cooperative transmit beamforming may be performed. The cooperative sounding process may include a process of acquiring channel information between a terminal, that is, a beamformer to perform transmission and a terminal, that is, a beamformee to perform reception in the cooperative transmit beamforming. According to an embodiment, the cooperative sounding process may include an operation of acquiring a precoding matrix to be used for the cooperative transmit beamforming. The precoding matrix may be configured to eliminate or minimize interference during the cooperative transmit beamforming. Operation 320 may be performed through wired or wireless communication between the APs.

In operation 330, NAVs of APs associated with the negotiation may be reset and NAVs of WLAN equipments unassociated with the negotiation may be set. That is, a protection may be performed to enable the transmission during the cooperative transmit beamforming duration by resetting the NAVs of the APs participating in the cooperative transmit beamforming, and to disable the transmission during the cooperative transmit beamforming duration by setting the NAVs of the WLAN equipments that do not participate in the cooperative transmit beamforming.

According to an embodiment, an AP leading a cooperative transmit beamforming among APs participating in the cooperative transmit beamforming may transmit a clear-to-send (CTS) in which an AP participating in cooperative transmit beamforming is set as a receiver address (RA). According to an Institute of Electrical and Electronics Engineers (IEEE) 802.11 standard, a WLAN equipment receiving a CTS in which the WLAN equipment is set as a receiver address may reset a NAV, and a WLAN equipment receiving a CTS in which the WLAN equipment is not set as a receiver address may set a NAV based on a value set in a duration field of the CTS. Accordingly, when the AP leading the cooperative transmit beamforming transmits a CTS in which an AP participating in the cooperative transmit beamforming is set as a receiver address and a duration field is set as a time when the cooperative transmit beamforming duration is terminated, the AP participating in the cooperative transmit beamforming may reset a NAV and a WLAN equipment that does not participate in the cooperative transmit beamforming may set a NAV until the cooperative transmit beamforming duration is terminated.

According to another embodiment, an AP leading a cooperative transmit beamforming among APs participating in the cooperative transmit beamforming may transmit a cooperative transmission (CoTx) request frame in which an AP participating in the cooperative transmit beamforming is set as a receiver address. When the AP leading the cooperative transmit beamforming transmits a CoTx request frame in which an AP participating in the cooperative transmit beamforming is set as a receiver address and a duration field is set as a time when a cooperative transmit beamforming duration is terminated, the AP participating in the cooperative transmit beamforming may reset a NAV and a WLAN equipment that does not participate in the cooperative transmit beamforming may set a NAV until the cooperative transmit beamforming duration is terminated.

Accordingly, the APs associated with the negotiation may concurrently perform the cooperative transmit beamforming, and the WLAN equipments unassociated with the negotiation may not transmit a frame during the cooperative transmit beamforming duration.

In operation 340, the APs associated with the negotiation may perform the cooperative transmit beamforming during the cooperative transmit beamforming duration. Each of the APs associated with the negotiation may transmit beamformed data to an STA included in a BSS covered by a corresponding AP. For example, when AP1 and AP2 are associated with a negotiation, AP1 may transmit a beamformed data frame to STA1 and an AP2 may transmit a beamformed data frame to STA2. The beamformed data frames may be concurrently transmitted from AP1 and AP2 during the cooperative transmit beamforming duration. According to an embodiment, a transmission of a beamformed data frame may be performed using a downlink MU-MIMO technology.

As described above, according to embodiments, the transmission efficiency in an OBSS environment may be enhanced by providing a cooperative transmit beamforming method that enables two or more APs to concurrently perform a transmit beamforming in the OBSS environment.

Figure 4:
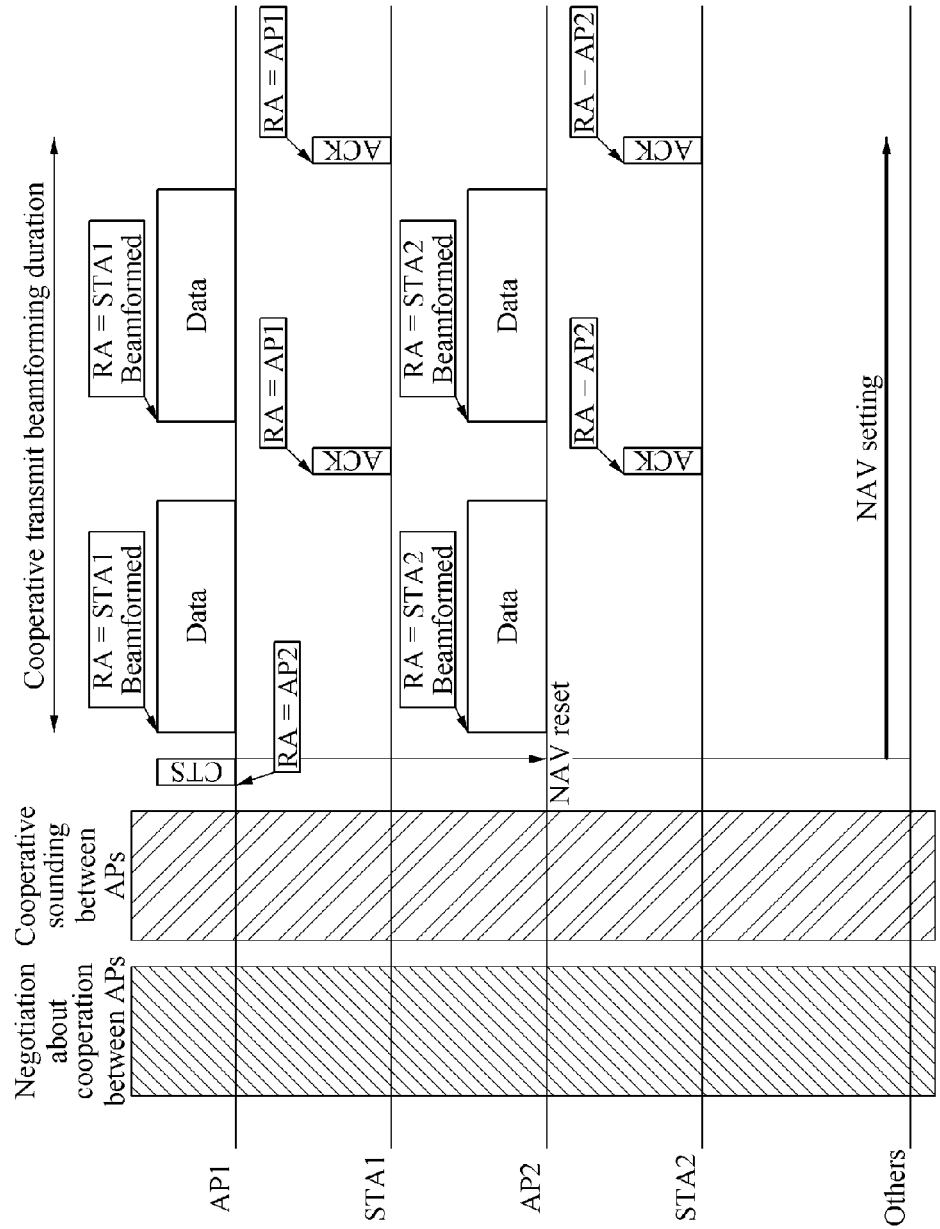
FIG. 4 illustrates an example of a protocol for performing cooperative transmit beamforming between APs according to an embodiment.

FIG. 4 illustrates an example of a protocol for performing cooperative transmit beamforming between APs according to an embodiment.

Referring to FIG. 4, AP1 and AP2 may be determined to participate in cooperative transmit beamforming through negotiation about the cooperative transmit beamforming. Here, a cooperative sounding process for the cooperative transmit beamforming between AP1 and AP2 may be performed. For example, each of AP1 and AP2 may acquire a precoding matrix to be used for the cooperative transmit beamforming through the cooperative sounding process. AP1 leading the cooperative transmit beamforming may transmit a CTS in which AP2 is set as a receiver address (RA), so that AP2 may reset a NAV. Here, a duration field of the CTS is set as a time when the cooperative transmit beamforming duration is terminated and thus, a WLAN equipment unassociated with the negotiation may set a NAV until the cooperative transmit beamforming duration is terminated. AP1 and AP2 may concurrently perform the cooperative transmit beamforming during the cooperative transmit beamforming duration. For example, AP1 may transmit a beamformed data frame to STA1 belonging to a BSS covered by AP1 and, at the same time, AP2 may transmit a beamformed data frame to STA2 belonging to a BSS covered by AP2. According to an embodiment, AP1 may transmit a beamformed data frame to STA1 after a predetermined time interval is elapsed, when transmission of a CTS is completed. AP2 may transmit a beamformed data frame to STA2 after a predetermined time interval is elapsed when reception of the CTS is completed. Here, the predetermined time interval may be a short inter-frame space (SIFS).

Figure 5:
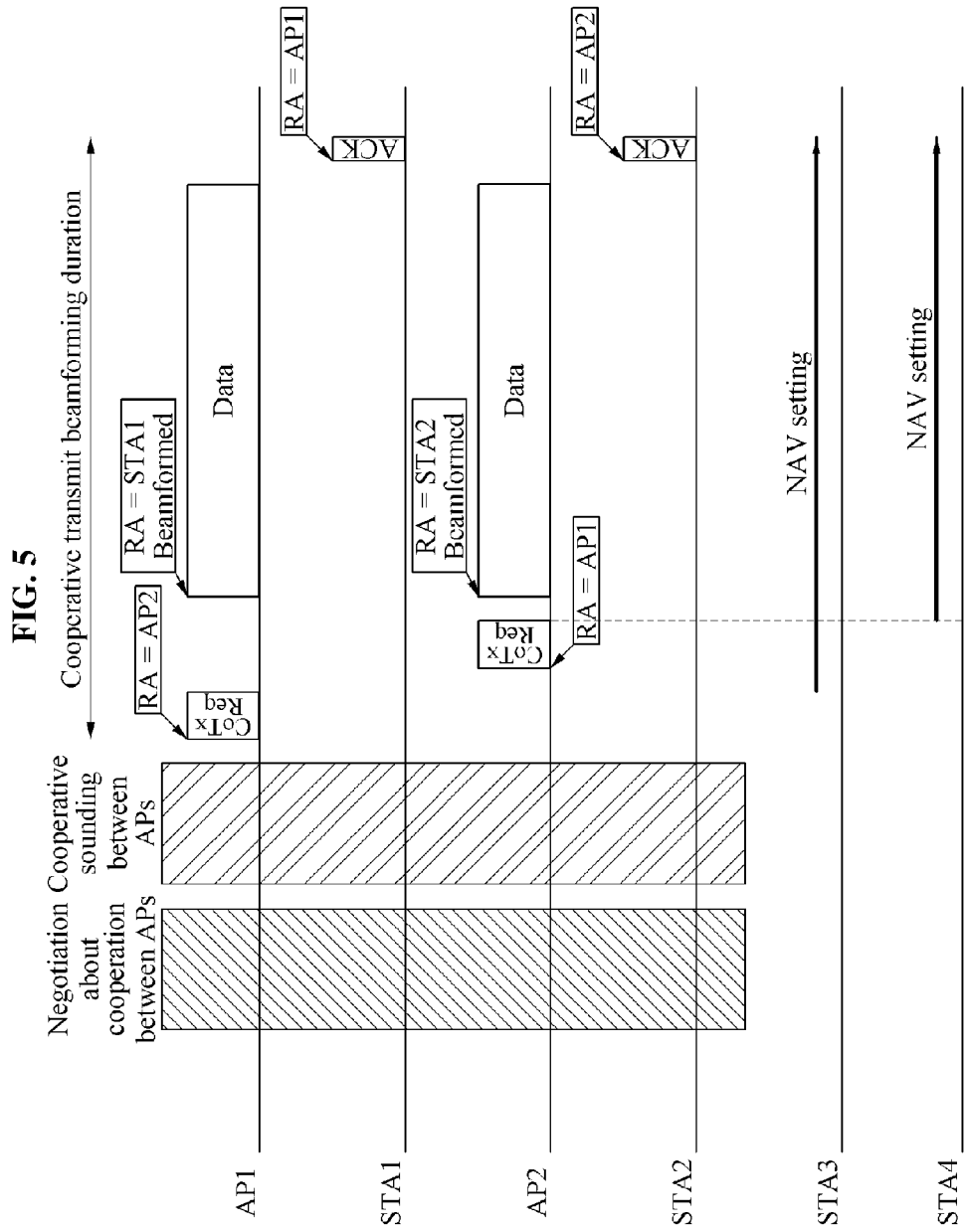
FIG. 5 illustrates another example of a protocol for performing cooperative transmit beamforming between APs according to an embodiment.

FIG. 5 illustrates another example of a protocol for performing cooperative transmit beamforming between APs according to an embodiment.

Referring to FIG. 5, AP1 and AP2 may be determined to participate in a cooperative transmit beamforming through negotiation about the cooperative transmit beamforming. Here, a cooperative sounding process for the cooperative transmit beamforming between AP1 and AP2 may be performed. For example, each of AP1 and AP2 may acquire a precoding matrix to be used for the cooperative transmit beamforming through the cooperative sounding process. AP1 leading the cooperative transmit beamforming may transmit a CoTx request frame in which AP2 is set as a receiver address (RA), so that AP2 may reset a NAV. Here, a duration field of the CoTx request frame may be set as a time when a cooperative transmit beamforming duration is terminated and thus, a WLAN equipment unassociated with the negotiation may set a NAV until the cooperative transmit beamforming duration is terminated. AP2 receiving the CoTx request frame may transfer an acknowledgement (ACK) frame about the CoTx request frame to AP1 by transmitting a CoTx response frame in which AP1 is set as a receiver address. Here, a duration field of the CoTx response frame is set as a time when the cooperative transmit beamforming duration is terminated and a WLAN equipment unassociated with the negotiation may set a NAV until the cooperative transmit beamforming duration is terminated. Here, AP1 and AP2 may concurrently perform the cooperative transmit beamforming during the cooperative transmit beamforming duration. For example, AP1 may transmit a beamformed data frame to STA1 belonging to a BSS covered by AP1 and, at the same time, AP2 may transmit a beamformed data frame to STA2 belonging to a BSS covered by AP2. According to an embodiment, AP1 may transmit a beamformed data frame to STA1 after a predetermined time interval is elapsed, when reception of a CoTx response frame is completed. AP2 may transmit a beamformed data frame to STA2 after a predetermined time interval is elapsed, when transmission of the CoTx response frame is completed. Here, the predetermined time interval may be a SIFS.

As described above, according to embodiments, the transmission efficiency in an OBSS environment may be enhanced by providing a cooperative transmit beamforming method that enables two or more APs to concurrently perform a transmit beamforming in the OBSS environment.

FIG. 6 illustrates a format of a CoTx request frame according to an embodiment.

The CoTx request frame may include a frame control (FC) field, a duration field, a receiver address (RA) field, a transmitter address (TA) field, and a frame check sequence (FCS) field as basic fields that constitute a WLAN MAC frame. According to an embodiment, the CoTx request frame may include a CoTx control field and a plurality of CoTx AP info fields to perform a cooperative transmit beamforming. The CoTx control field may include information about the number of APs participating in the cooperative transmit beamforming and information, for example, information constituting L-LENGTH and VHT-SIGA in the case of VHT PPDU, used to make a temporal length of a beamformed data frame equal to a temporal length of a un-beamformed data frame, for example, L-SIG and VHT-SIGA in the case of VHT PPDU. The number of CoTx AP info fields may be the same as the number of APs participating in the cooperative transmit beamforming. The CoTx AP info fields may include information indicating the APs that participate in the cooperative transmit beamforming, respectively. Information indicating each of the APs that participate in the cooperative transmit beamforming may include a BSS ID or information capable of identifying a corresponding AP.

Figure 7:
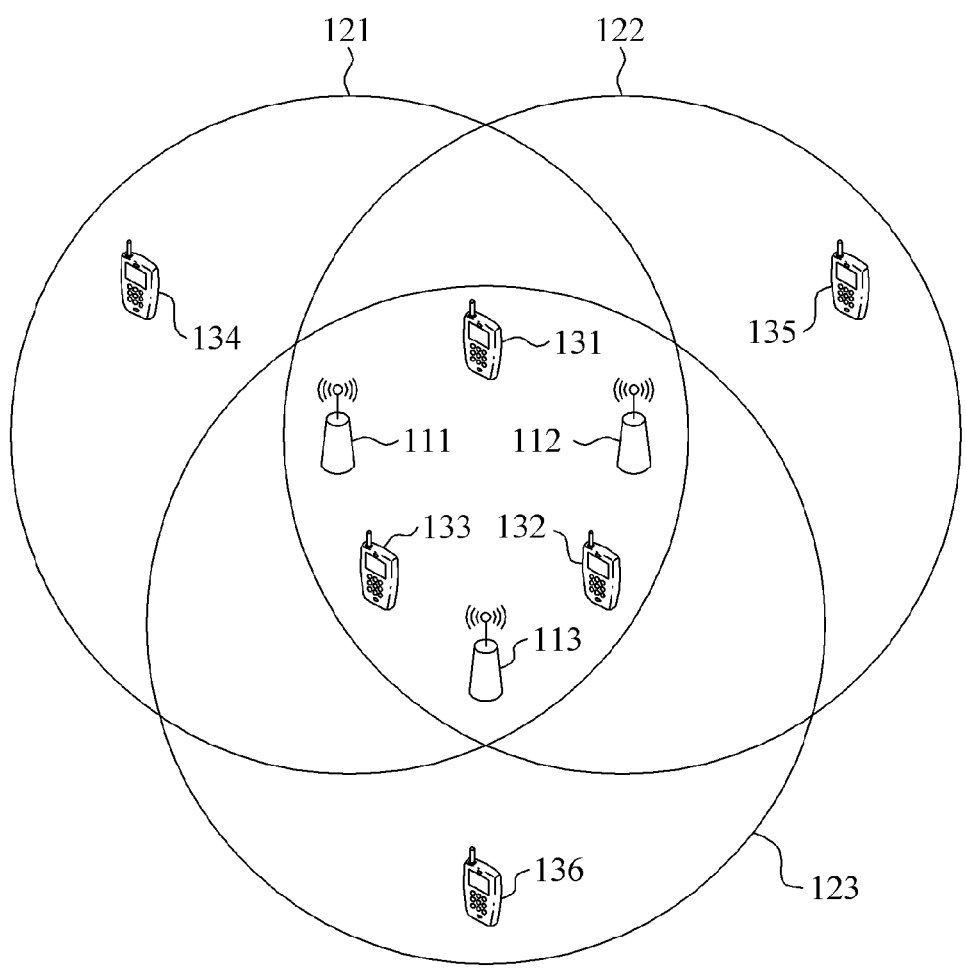
FIG. 7 illustrates an environment in which BSSs covered by APs of a WLAN overlap.

FIG. 7 illustrates an environment in which BSSs covered by APs of a WLAN overlap.

Referring to FIG. 7, a BSS 121 is covered by an AP 111, a BSS 122 is covered by an AP 112, and a BSS 123 is covered by an AP 113. STAs 131 and 134 may belong to the BSS 121, STAs 132 and 135 may belong to the BSS 122, and STAs 133 and 136 belong to the BSS 123. An overlapping area may be present among the BSSs 121, 122, and 123 of the APs 111, 112, and 113. The STA 131 belonging to the BSS 121, the STA 132 belonging to the BSS 122, and the STA 133 belonging to the BSS 123 may be positioned in the overlapping area. Here, when the BSSs 121, 122, and 123 use the same frequency channel, the APs 111, 112, and 113 and the STAs 131, 132, and 133 may hear all of the transmitting frames. Accordingly, the transmission efficiency may be degraded in the overlapping area. A method of preventing the degradation in the transmission efficiency in an OBSS environment is required.

According to embodiments, the transmission efficiency in an OBSS environment may be enhanced by providing a method that enables three or more APs to concurrently transmit data even in the OBSS environment.

Figure 8:
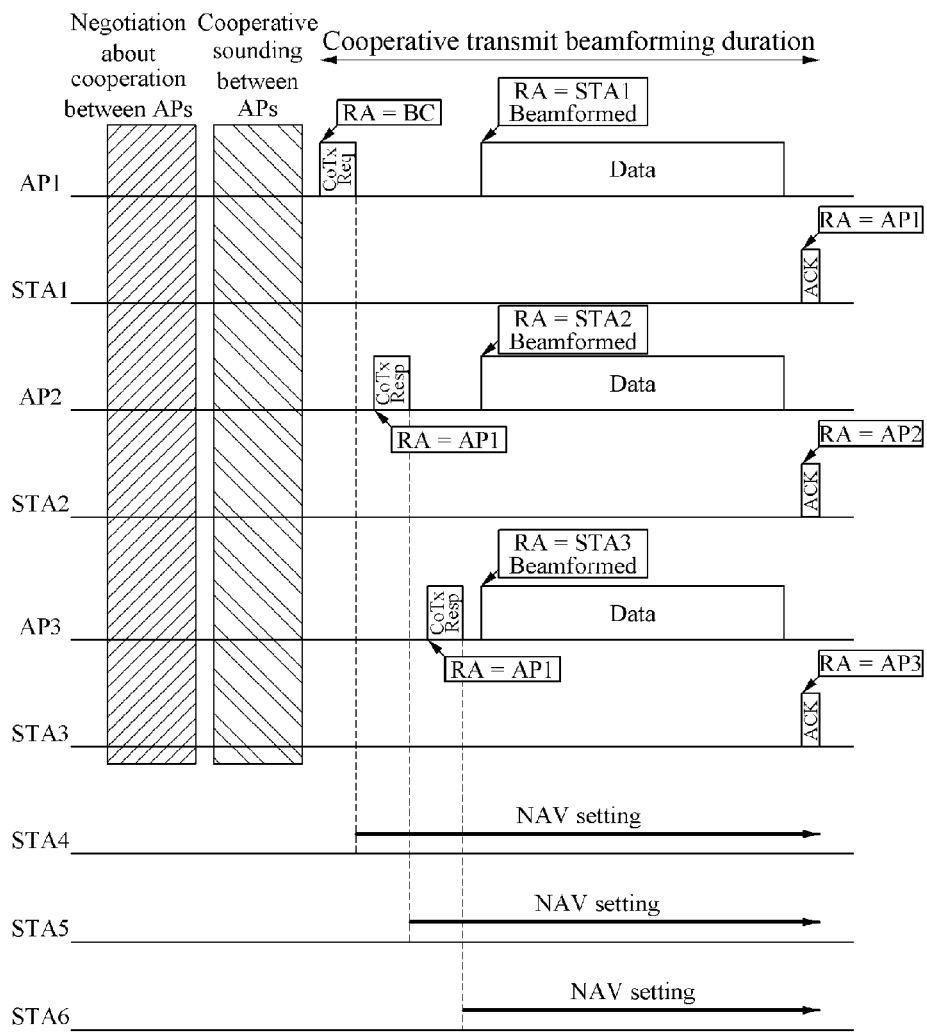
FIG. 8 illustrates another example of a protocol for performing cooperative transmit beamforming between APs according to an embodiment.

FIG. 8 illustrates another example of a protocol for performing cooperative transmit beamforming between APs according to an embodiment. In FIG. 8, APs participating in the cooperative transmit beamforming sequentially respond to a single CoTx request frame.

Referring to FIG. 8, AP1, AP2, and AP3 may be determined to participate in the cooperative transmit beamforming through negotiation about the cooperative transmit beamforming. A cooperative sounding process for the cooperative transmit beamforming among AP1, AP2, and AP3 may be performed. For example, each of AP1, AP2, and AP3 may acquire a precoding matrix to be used for the cooperative transmit beamforming through the cooperative sounding process. AP1 leading the cooperative transmit beamforming may transmit a CoTx request frame in which a broadcast address (BC) is set as a receiver address. Here, a duration field of the CoTx request frame is set as a time when a cooperative transmit beamforming duration is terminated and thus, a WLAN equipment unassociated with the negotiation may set a NAV until the cooperative transmit beamforming duration is terminated. Also, a first CoTx AP info field of the CoTx request frame may include information indicating AP2 and a second CoTx AP info field of the CoTx request frame may include information indicating AP3. Accordingly, AP2 and AP3 participating in the cooperative transmit beamforming may rest a NAV. AP2 associated with the first CoTx AP info field may transfer an ACK frame about the CoTx request frame to AP1 by transmitting a CoTx response frame in which AP1 is set as a receiver address. Here, a duration field of the CoTx response frame is set as a time when the cooperative transmit beamforming duration is terminated and thus, the WLAN equipment unassociated with the negotiation may set a NAV until the cooperative transmit beamforming duration is terminated. AP3 associated with a subsequent CoTx AP info field may transfer an ACK frame about the CoTx request frame to AP1 by transmitting a CoTx response frame in which AP1 is set as a receiver address. Here, a duration field of the CoTx response frame is set as a time when the cooperative transmit beamforming duration is terminated and thus, the WLAN equipment unassociated with the negotiation may set a NAV until the cooperative transmit beamforming duration is terminated. AP1, AP2, and AP3 may perform the cooperative transmit beamforming during the cooperative transmit beamforming duration. For example, AP1 may transmit a beamformed data frame to STA1 belonging to a BSS covered by AP1, AP2, at the same time, may transmit a beamformed data frame to STA2 belonging to a BSS covered by AP2, and AP3, at the same time, may transmit a beamformed data frame to STA3 belonging to a BSS covered by AP3. According to an embodiment, AP1 and AP2 may transmit beamformed data frames to STA1 and STA2, respectively after a predetermined time interval is elapsed, when reception of a last CoTx response frame is completed. AP3 associated with a last CoTx AP info field may transmit a beamformed data frame to STA3 after a predetermined time interval is elapsed, when transmission of a CoTx response frame is completed. Here, the predetermined time interval may be a SIFS.

Figure 9:
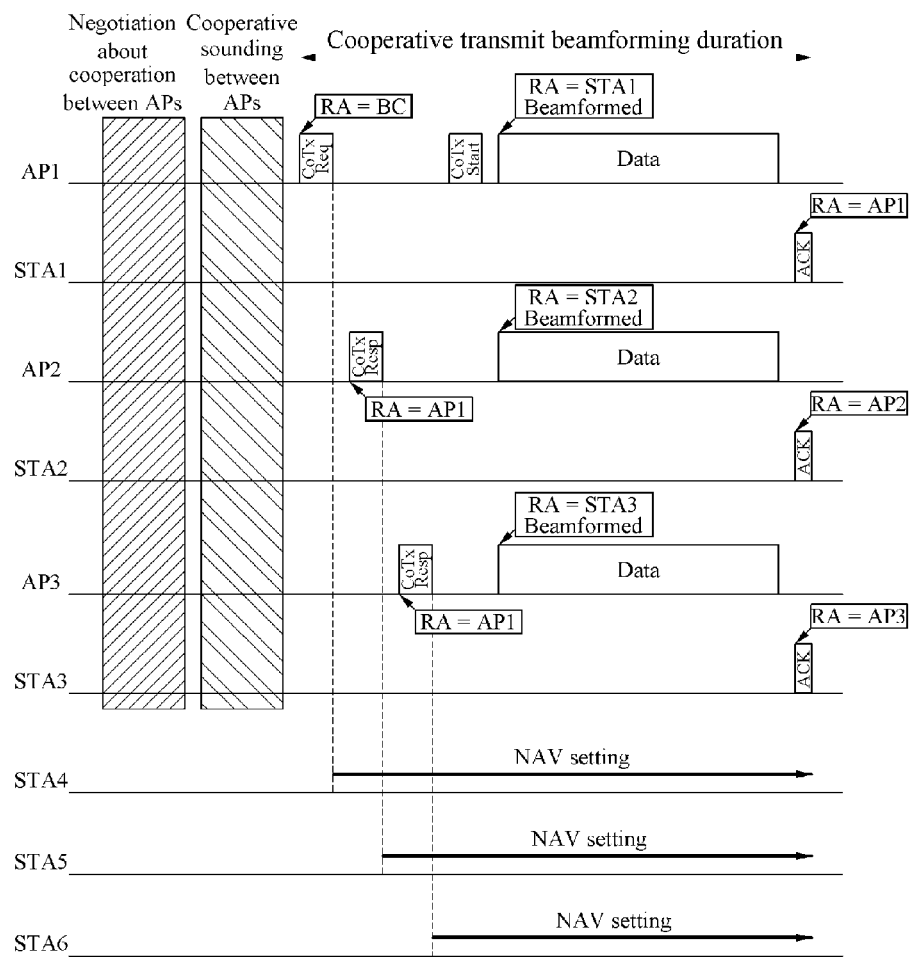
FIG. 9 illustrates still another example of a protocol for performing cooperative transmit beamforming between APs according to an embodiment.

FIG. 9 illustrates still another example of a protocol for performing cooperative transmit beamforming between APs according to an embodiment. In FIG. 9, APs participating in the cooperative transmit beamforming sequentially respond to a single CoTx request frame.

In the embodiment of FIG. 9, when one of the APs participating in the cooperative transmit beamforming does not respond or one of CoTx response frames is lost, it may be difficult to determine a transmission start point in time of a beamformed data frame. To clarify the transmission start point in time of the beamformed data frame, AP1 leading the cooperative transmit beamforming may transmit a CoTx start frame. The CoTx start frame may be transmitted after a predetermined time interval is elapsed, when reception of a last CoTx response frame is completed. According to an embodiment, AP1 may transmit a beamformed data frame to STA1 after a predetermined time interval is elapsed, when transmission of the CoTx start frame is completed. AP2 and AP3 may transmit beamformed data frames to STA2 and STA3, respectively, after a predetermined time interval is elapsed, when reception of the CoTx start frame is completed. Here, the predetermined time interval may be a SIFS.

Figure 10:
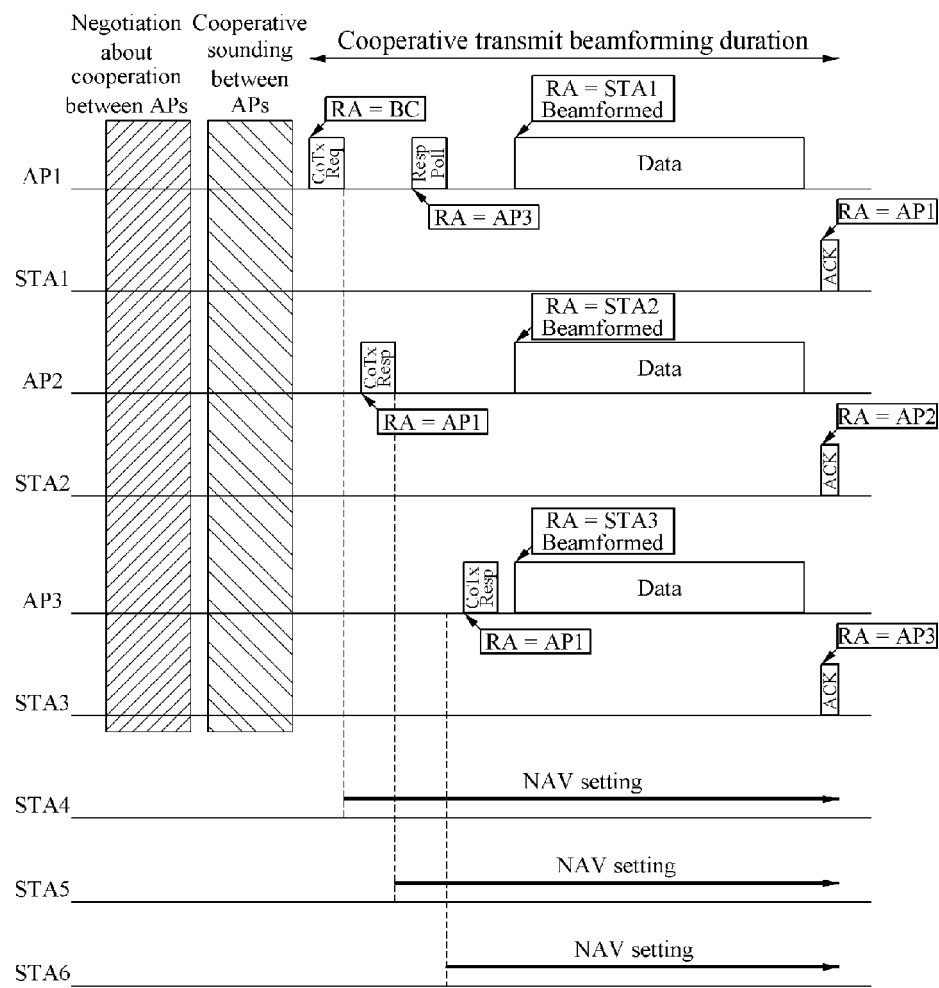
FIG. 10 illustrates still another example of a protocol for performing cooperative transmit beamforming between APs according to an embodiment.

FIG. 10 illustrates still another example of a protocol for performing cooperative transmit beamforming between APs according to an embodiment. In FIG. 10, an AP associated with a first CoTx AP info field of a CoTx request frame may respond immediately after receiving the CoTx request frame, and each of APs associated with remaining CoTx AP info fields of the CoTx request frame may respond after receiving a CoTx response poll frame.

Referring to FIG. 10, AP1, AP2, and AP3 may be determined to participate in the cooperative transmit beamforming through negotiation about the cooperative transmit beamforming. A cooperative sounding process for the cooperative transmit beamforming among AP1, AP2, and AP3 may be performed. For example, each of AP1, AP2, and AP3 may acquire a precoding matrix to be used for the cooperative transmit beamforming through the cooperative sounding process. AP1 leading the cooperative transmit beamforming may transmit a CoTx request frame in which a BC is set as a receiver address. Here, a duration field of the CoTx request frame is set as a time when a cooperative transmit beamforming duration is terminated and thus, a WLAN equipment unassociated with the negotiation may set a NAV until the cooperative transmit beamforming duration is terminated. Also, a first CoTx AP info field of the CoTx request frame may include information indicating AP2 and a second CoTx AP info field of the CoTx request frame may include information indicating AP3. Accordingly, AP2 and AP3 participating in the cooperative transmit beamforming may rest a NAV. AP2 associated with the first CoTx AP info field may transfer an ACK frame about the CoTx request frame to AP1 by transmitting a CoTx response frame in which AP1 is set as a receiver address. Here, a duration field of the CoTx response frame is set as a time when the cooperative transmit beamforming duration is terminated and thus, the WLAN equipment unassociated with the negotiation may set a NAV until the cooperative transmit beamforming duration is terminated. AP1 leading the cooperative transmit beamforming may transmit a CoTx response poll frame in which AP3 associated with a subsequent CoTx AP info field is set as a receiver address. AP3 receiving the CoTx response poll frame may transfer an ACK frame about the CoTx response poll frame to AP1 by transmitting a CoTx response frame in which AP1 is set as a receiver address. Here, a duration field of the CoTx response frame is set as a time when the cooperative transmit beamforming duration is terminated and thus, the WLAN equipment unassociated with the negotiation may set a NAV until the cooperative transmit beamforming duration is terminated. AP1, AP2, and AP3 may perform the cooperative transmit beamforming during the cooperative transmit beamforming duration. For example, AP1 may transmit a beamformed data frame to STA1 belonging to a BSS covered by AP1, AP2, at the same time, may transmit a beamformed data frame to STA2 belonging to a BSS covered by AP2, and AP3, at the same time, may transmit a beamformed data frame to STA3 belonging to a BSS covered by AP3. According to an embodiment, AP1 and AP2 may transmit beamformed data frames to STA1 and STA2, respectively, after a predetermined time interval is elapsed, when reception of a last CoTx response frame is completed. AP3 associated with a last CoTx AP info field may transmit a beamformed data frame to STA3 after a predetermined time interval is elapsed, when transmission of a CoTx response frame is completed. Here, the predetermined time interval may be a SIFS.

As described above, according to embodiments, the transmission efficiency in an OBSS environment may be enhanced by providing a cooperative transmit beamforming method that enables three or more APs to concurrently perform a transmit beamforming in the OBSS environment.

Figure 11:
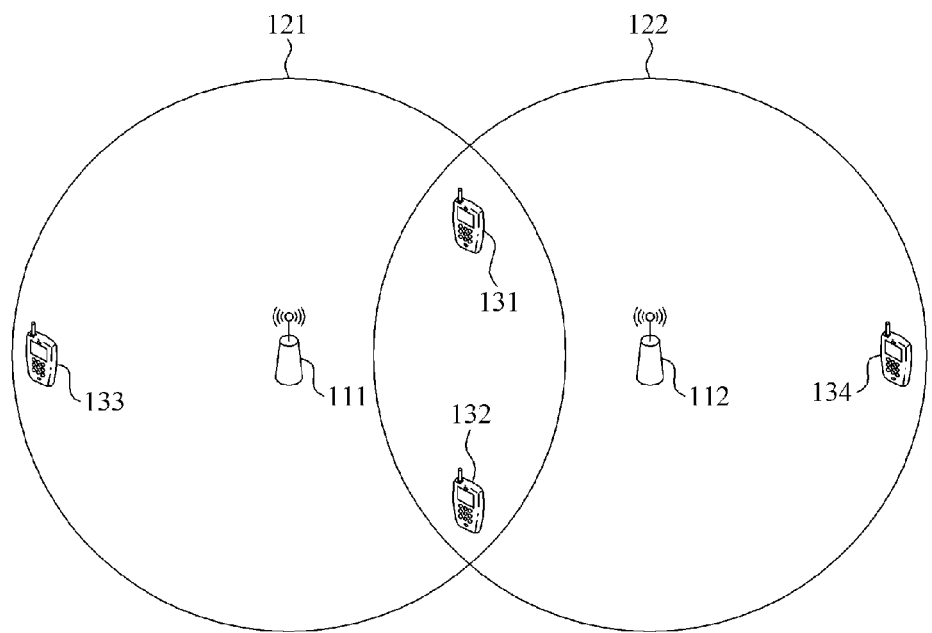
FIG. 11 illustrates an example in which BSSs covered by APs of a WLAN overlap.

FIG. 11 illustrates an example in which BSSs covered by APs of a WLAN overlap. Referring to FIG. 11, a BSS 121 is covered by an AP 111 and a BSS 122 is covered by an AP 112. STAs 131 and 133 may belong to the BSS 121. STAs 132 and 134 may belong to the BSS 122. An overlapping area may be present between the BSSs 121 and 122 of the APs 111 and 112. The STA 131 belonging to the BSS 121 and the STA 132 belonging to the BSS 122 may be positioned in the overlapping area. Dissimilar to the embodiment of FIG. 1 or FIG. 7, the APs 111 and 112 are positioned outside an OBSS area and the STAs 131 and 132 are positioned in the OBSS area. In this environment, since a transmission start point in time of a beamformed data frame using direct communication between APs cannot be known, an STA positioned in an OBSS area may be employed as a relay equipment.

FIG. 12 illustrates still another example of a protocol for performing cooperative transmit beamforming between APs according to an embodiment. FIG. 12 illustrates a method of using an STA positioned in an OBSS area between APs participating in the cooperative transmit beamforming as a relay equipment.

Referring to FIG. 12, AP1 and AP2 may be determined to participate in the cooperative transmit beamforming through negotiation about the cooperative transmit beamforming. According to an embodiment, AP1 may recognize that AP1 and AP2 are positioned outside an OBSS area and STA1 belonging to a BSS covered by AP1 is positioned in the OBSS area, through the negotiation. A cooperative sounding process for the cooperative transmit beamforming between AP1 and AP2 may be performed. For example, each of AP1 and AP2 may acquire a precoding matrix to be used for the cooperative transmit beamforming through the cooperative sounding process. AP1 leading the cooperative transmit beamforming may transmit a CoTx request frame in which STA1 that is a relay equipment is set as a receiver address. Here, a duration field of the CoTx request frame is set as a time when the cooperative transmit beamforming duration is terminated and thus, a WLAN equipment unassociated with the negotiation may set a NAV until the cooperative transmit beamforming duration is terminated. STA1 receiving the CoTx request frame may transmit a CoTx request frame in which a BC is set as a receiver address, so that AP2 may reset a NAV. AP2 receiving the CoTx request frame may transfer an ACK frame about the CoTx request frame to STA1 by transmitting the CoTx response frame in which STA1 is set as a receiver address. Here, a duration field of the CoTx response frame is set as a time when the cooperative transmit beamforming duration is terminated and thus, the WLAN equipment unassociated with the negotiation may set a NAV until the cooperative transmit beamforming duration is terminated. STA1 may receive a CoTx response frame from APs participating in the cooperative transmit beamforming and then transmit a CoTx start frame. The CoTx start frame may be transmitted after a predetermined time interval is elapsed, when reception of a last CoTx response frame is completed. AP1 and AP2 may concurrently perform the cooperative transmit beamforming during the cooperative transmit beamforming duration. For example, AP1 may transmit a beamformed data frame to STA1 belonging to a BSS covered by AP1 and, at the same time, AP2 may transmit a beamformed data frame to STA2 belonging to a BSS covered by AP2. According to an embodiment, AP1 and AP2 may transmit beamformed data frames to STA1 and STA2, respectively, after a predetermined time interval is elapsed, when reception of a CoTx start frame is completed. Here, the predetermined time interval may be a SIFS.

As described above, according to embodiments, the transmission efficiency in an OBSS environment may be enhanced by providing a cooperative transmit beamforming protocol that enables two or more APs to concurrently perform transmit beamforming in the OBSS environment by using an STA positioned in an OBSS area as a relay equipment when APs having the OBSS area are positioned outside the OBSS area.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A communication device for performing cooperative beamforming communication, the communication device comprising:
a transceiver configured to transmit and receive a frame associated with negotiation about a cooperative transmit beamforming with one or more other communication devices having an overlapped basic service set (OBSS) area with the communication device, to transmit a cooperative transmission request frame to the one or more other communication devices, and to receive a cooperative transmission response frame that is transmitted from the one or more other communication devices in response to the cooperative transmission request frame; and
a controller configured to control the transceiver to perform the cooperative transmit beamforming with the one or more other communication devices, upon a completion of reception of the cooperative transmission response frame, during a time duration of the cooperative transmit beamforming and after a predetermined time interval has elapsed from the completion of the reception.

2. The communication device of claim 1, wherein the controller is further configured to control the transceiver to transmit the cooperative transmission request frame to the one or more other communication devices in response to the transceiver receiving the frame associated with the negotiation from the one or more other communication devices.

3. The communication device of claim 1, wherein the controller is further configured to generate the cooperative transmission request frame to be transmitted to the one or more other communication devices.

4. The communication device of claim 1, wherein the cooperative transmission request frame comprises a Cooperative Transmission(CoTx) control field which includes information on a number of communication devices that participates in the cooperative transmit beamforming.

5. The communication device of claim 1, wherein the cooperative transmission request frame comprises Cooperation Transmission Access Points (CoTxAP) info fields which include information indicating the communication devices that participate in the cooperative transmit beamforming.

6. The communication device of claim 1, wherein a duration field of the cooperative transmission request frame and a duration field of the cooperative transmission response frame are set as a time that the cooperative transmit beamforming duration terminates.

7. A communication device for performing cooperative beamforming communication, the communication device comprising:
  a transceiver configured to transmit and receive a frame associated with negotiation about a cooperative transmit beamforming with one or more other communication devices having an OBSS area with the communication device, to transmit a cooperative transmission response frame in response to a cooperative transmission request frame that is transmitted from the one or more other communication devices; and
  a controller configured to control the transceiver to perform the cooperative transmit beamforming with the one or more other communication devices, upon a completion of reception of the cooperative transmission response frame by the one or more other communication devices, during a time duration of the cooperative transmit beamforming and after a predetermined time interval has elapsed from the completion of the reception.

8. The communication device of claim 7, wherein the controller is further configured to generate the cooperative transmission response frame to be transmitted to the one or more other communication devices.

9. The communication device of claim 7, wherein the cooperative transmission request frame comprises a Cooperative Transmission (CoTx) control field which includes information on a number of communication devices that participates in the cooperative transmit beamforming.

10. The communication device of claim 7, wherein the cooperative transmission request frame comprises Cooperative Transmission Access Points (CoTxAP) info fields which include information indicating the communication devices that participate in the cooperative transmit beamforming.

11. The communication device of claim 7, wherein a duration field of the cooperative transmission request frame and a duration field of the cooperative transmission response frame are set as a time that the cooperative transmit beamforming duration terminates.

12. A relay device for performing cooperative beamforming communication, the relay device comprising:
  a transceiver configured to: receive a cooperative transmission request frame that is transmitted from a communication device, broadcast the cooperative transmission request frame, and receive a cooperative transmission response frame that is transmitted from one or more other communication devices having an OBSS area with the communication device to the communication device in response to the cooperative transmission request frame; and
  a controller configured to control the transceiver to broadcast a cooperative transmission start frame in response to the cooperative transmission response frame so as to the communication device and the one or more other communication devices perform the cooperative transmit beamforming, upon a completion of reception of the cooperative transmission start frame, during a time duration of the cooperative transmit beamforming and after a predetermined time interval has elapsed from the completion of the reception.

13. The relay device of claim 12, wherein the cooperative transmission request frame comprises a Cooperative Transmission (CoTx)control field which includes information on a number of communication devices that participates in the cooperative transmit beamforming.

14. The relay device of claim 12, wherein the cooperative transmission request frame comprises a Cooperative Transmission Access Points (CoTx AP) info fields which include information indicating the communication devices that participate in the cooperative transmit beamforming.

15. The relay device of claim 12, wherein a duration field of the cooperative transmission request frame and a duration field of the cooperative transmission response frame are set as a time that the cooperative transmit beamforming duration terminates.

* * * * *